June 1, 1926.
M. MOSKOWITZ
1,587,346
VEHICLE BRAKE MECHANISM
Filed Sept. 5, 1925
2 Sheets-Sheet 1
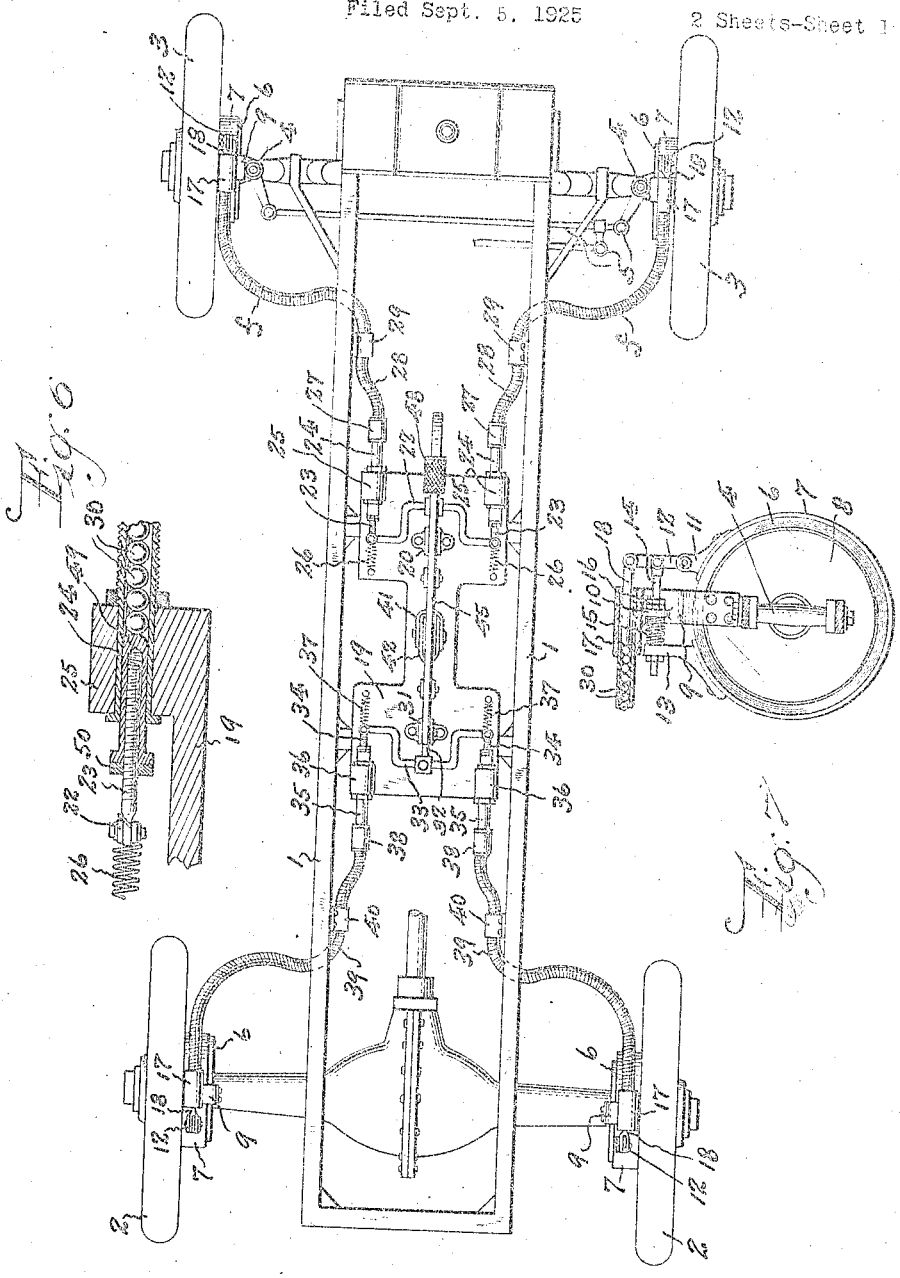
INVENTOR.
Morris Moskowitz,
BY
Frantzel and Richards
ATTORNEYS.

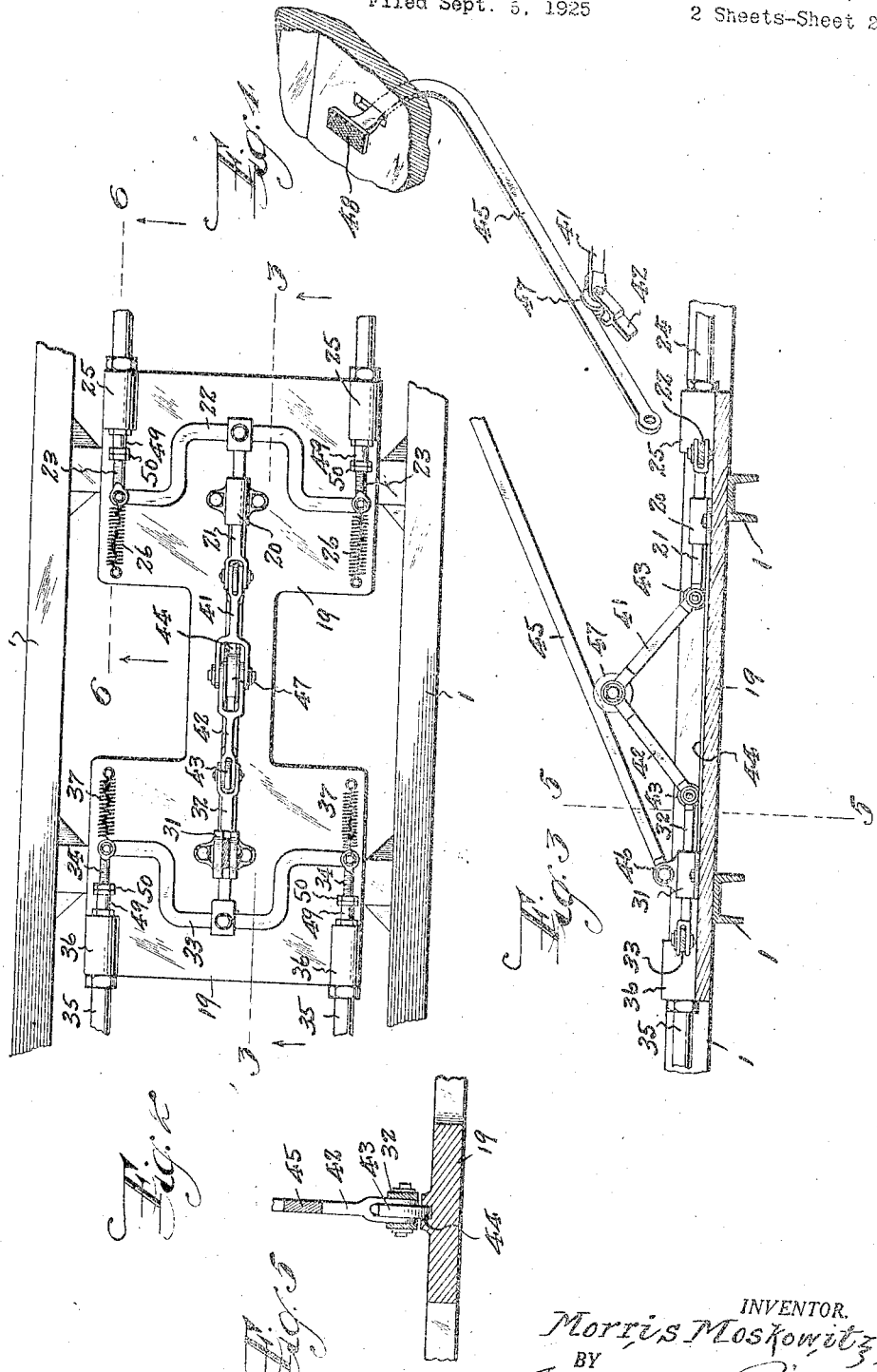

Patented June 1, 1926.

1,587,346

UNITED STATES PATENT OFFICE.

MORRIS MOSKOWITZ, OF UPPER MONTCLAIR, NEW JERSEY; BANKERS TRUST COMPANY EXECUTOR OF SAID MORRIS MOSKOWITZ, DECEASED.

VEHICLE BRAKE MECHANISM.

Application filed September 5, 1925. Serial No. 54,659.

This invention relates, generally, to improvements in brake mechanism for vehicles, and especially for automobiles having pivotally mounted front wheels; and the invention has reference, more particularly, to a novel solely mechanical arrangement for applying power to the brake devices of vehicle wheels, in connection with either two or four wheel brake systems, while at the same time equalizing the transmission of the applied power to all the brake devices served thereby.

The invention has for its principal object to provide a simple and effective power transmission means for vehicle brakes, which is especially adapted to efficiently actuate brakes connected with the pivotally mounted front wheels of a vehicle, notwithstanding the steering oscillations of said wheels and without interfering with the freedom of such oscillations; the invention has for a further object to provide, especially when used in connection with four wheel brake systems, means whereby the power transmitted is equally distributed or equalized relative to all four wheels of the vehicle; and the invention has reference to a novel construction of flexible power transmission means, whereby the applied power is delivered by thrust through flexible guides, as distinguished from systems whereby the power is transmitted by pull.

Other objects of this invention, not at this time more particularly enumerated, will be clearly understood from the following detailed description of the same.

The invention is clearly illustrated in the accompanying drawings, in which:—

Figure 1 is a plan view of a chassis of an automobile equipped with the novel brake mechanism made according to and embodying the principles of this invention; Figure 2 is an enlarged plan view of the means for equalizing the transmission of power to the wheel brakes; Figure 3 is a vertical longitudinal section taken on line 3—3 in Figure 2; Fig. 4 is a fragmentary perspective view of one arrangement of foot lever for actuating the novel power transmitting and equalizing mechanism; Figure 5 is a fragmentary cross section taken on line 5—5 in Figure 3; Figure 6 is an enlarged fragmentary longitudinal section of the flexible thrust transmission serving the brake devices per se; and Figure 7 is an enlarged elevation of the brake devices connected with the vehicle wheels.

Similar characters of reference are employed in all of the herein above described views, to indicate corresponding parts.

Referring now to said drawings, the reference character 1 indicates the chassis of an automobile including the usual front and rear axle structures. The rear wheels 2 are mounted in the usual manner so as to be driven in the ordinary way, and the front wheels 3 are mounted to oscillate in horizontal plane on the steering knuckle connections 4 under the control of the usual steering mechanism partially shown at 5. Each of the rear and front wheels 2 and 3 are provided with service brake devices, each comprising a brake drum 6 which is encircled by a discontinuous brake band 7 subject, when actuated, to contraction upon and around said brake drum. A stationary plate 8 is provided adjacent to the inner side of the drum. (In the brake devices connected with the rear wheels the stationary plates 8 are mounted in connection with the rear housing, while in the brake devices connected with the front wheels the said plates are mounted in connection with the movable element of the steering knuckle connections 4.) Supported by the stationary plate 8 is a bracket member 9 having a perforate lug 10. Connected with one end of said brake band 7 is a knuckle 11 to which is pivotally connected the lower end of an actuating lever 12. Connected with the opposite end of said brake band 7 is an ear 13. Pivotally connected with said actuating lever 12 intermediate its ends is a link 14 which extends slidably through said lug 10 of the bracket member 9, and the free end of which is suitably coupled with said ear 13. Arranged around said link 14 between the brake band ear 13 and the bracket member lug 10 is a compression spring 15, which normally tends to hold said brake band 7 expanded. Said link 14 is threaded to receive adjustable stop-nuts 16 engageable with the opposite side of said bracket member lug 10 to determine the normal expansion of the brake band 7. Connected with the upper free end of said bracket member 9 is a guide block 17 in which is disposed for longitudinal reciprocation a plunger member 18, the outer free end of which is pivotally connected with the upper end of said actuating lever 12.

The power transmission and equalizing means serving the above described brake devices comprises the following mechanism. Supported in connection with the chassis in a convenient location is a base plate 19 or other suitable frame work. Connected with said base plate or frame work 19, adjacent to the forward end thereof, is a stationary guide block 20 in which is slidably mounted, for longitudinal reciprocation therein, a push-bar 21. Pivotally connected with the outer end of said reciprocable push-bar 21 is a transverse equalizer bar 22. Pivotally connected to the respective free ends of said equalizer bar 22 are thrust plungers 23. Said thrust plungers 23 are longitudinally reciprocable in guide sleeves 24 which are rigidly secured to and supported by stationary housing blocks 25 connected with the forward end of said base plate or framework 19. Suitably anchored pull springs 26 are connected with the respective free ends of said equalizer bar 22 to normally retract the latter and its push bar 21 together with said thrust plungers 23 to initial positions. Coupled in communication with the outer end of each guide sleeve 24, by means of any form of coupling union 27 found convenient, is one end of a flexible tubular guide 28. Said flexible tubular guides respectively extend forwardly into operative connection with the respective brake devices of the front wheels 3, and to this end are respectively coupled in communication with the guide blocks 17 of said respective brake devices so as to be opposed to the plunger members 18 of the latter. Said flexible tubular guides 28 may be attached by clips 29 to the chassis frame 1 at points adjacent to the front wheels 3, so as to leave a freely movable or flexing portion f extending from such point of attachment to the front wheel brake devices, so that the steering movements or oscillations of the said front wheels 3 will not be impeded, but rather the flexing of said portions f of the guides 28 will readily yield to such movements, while not in any way interfering with the transmission of brake applying power therethrough, as will be understood from the further description here following. Housed in said flexible tubular guides 28, so as to extend between the thrust plungers 23 and the plunger members 18 of the front wheel brake devices, are trains of power transmission thrust elements, preferably in the form of steel balls 30, although shapes of such thrust elements other than the spherical or ball shape shown in the drawings may be employed if desired.

A similar power transmission and equalizing means may be provided for actuating the brake devices of the rear wheels 2, the same consisting of a stationary guide block 31, mounted on the rear end of said base plate or frame work 19, in which is slidably mounted, for longitudinal reciprocation therein, a push bar 32. Pivotally connected with the outer end of said push bar 32 is a transverse equalizer bar 33. Pivotally connected to the respective free ends of said equalizer bar 33 are thrust plungers 34. Said thrust plungers 34 are longitudinally reciprocable in guide sleeves 35 which are rigidly secured to and supported by stationary housing blocks 36 connected with the rearward end of said base plate or frame work 19. Suitably anchored pull springs 37 are connected with the respective free ends of said equalizer bar 33 to normally retract the latter and its push bar 32 together with said thrust plungers 34 to initial positions. Coupled in communication with the outer end of each guide sleeve 35, by means of a suitable coupling union 38, is one end of a flexible tubular guide 39. Said guides 39 respectively extend rearwardly into operative connection with the respective brake devices of the rear wheels 2, and to this end are respectively coupled in communication with the guide blocks 17 of said respective rear wheel brake devices so as to be opposed to the plunger members thereof. Said guides 39 may be supported at points intermediate their ends by clips 40 connected with the chassis 1. Housed in said guides 39, so as to extend between the thrust plungers 34 and the plunger members of the rear wheel brake devices, are trains of power transmission elements preferably in the form of steel balls.

The means for simultaneously applying power to the push bars 21 and 32, while at the same time equalizing the power so applied, consists in a toggle-joint lever comprising a pair of links 41 and 42 pivotally connected at their inner ends and having their respective outer ends pivotally connected with the inner ends of said respective push bars 21 and 32. Preferably the pivotal connections between the outer ends of the toggle links 41 and 42 and the push bars 21 and 32 includes anti-friction rollers 43 which are guided in a trackway 44 with which the base plate or frame work 19 is provided. Power is applied at the toggle joint of the links 41 and 42, preferably by a downward thrust thereon which causes the toggle-joint lever to extend and thus produce equalized outwardly thrusting movements of the respective push bars 21 and 32. A suitable means for thus actuating the toggle-joint lever consists in a foot lever 45, fulcrumed at 46 on the top of said rear guide block 31, or at any other convenient location, so as to extend forwardly and upwardly over the toggle-joint lever. The pivotal connection of the inner end of the toggle links 41 and 42 may include a flanged anti-friction roller 47 on which said foot lever 45 bears. The free end of said foot lever 45 is upturned to project through the floor of the vehicle body mounted on the chassis 1, and terminates in a pedal 48 to which the operator may apply the foot in depressing the foot lever and thus actuating the brake mechanism. It will be understood that other forms of connection between the foot lever 45 and toggle-joint lever may be employed, or other forms of power applying means to serve said toggle-joint lever may be employed within the scope of this invention.

It is desirable to so construct the thrust plungers 23 and 24 that the same may be extensible or adjustable longitudinally to take up wear in the transmission elements 30, and to individually relate the transmission mechanism as whole in proper adjustment to the brake devices of each wheel. To this end each thrust plunger proper is threaded to receive on its free end an extensible member 49 which may be longitudinally moved on the plunger proper to lengthen or shorten its total length as may be desirable. The threaded plunger proper is also provided with a lock nut 50 for jamming or locking the extensible member in desired adjusted position thereon, all of which is most clearly shown in Figure 6 of the drawings.

In operation, when the foot lever is depressed the toggle-joint lever is depressed and extended forwardly and rearwardly to outwardly move the thrust bars 21 and 32. The outward movement of the thrust bars 21 and 32 move outwardly the respective transverse equalizer bars 22 and 33, and thus thrust upon the thrust plungers 23 and 34. The forward movement thus imparted to the thrust plungers 23 and 34 is transmitted through the transmission elements 30, which are caused to move forwardly through their respective guides 28 and 39, whereby the plunger member 18 of each individual brake device is moved to turn the actuating lever 12, thus drawing the link 14 whereby the ends of the brake band 7 are moved toward each other to thus contract the latter on the brake drum 6. This operation is easily effected notwithstanding the flexible sections $f$ of the guides 28, since although such sections will flex or yield to steering movements of the front wheels they nevertheless permit free longitudinal movement of the train of transmission elements therethrough, so that the thrust of the latter is none-the-less transmitted to the plunger members 18 of the front wheel brake devices. It will also be evident that the transmission of the applied power to the brake devices of both the front and rear wheels is mutually equalized throughout, that is the applied pressure is equally applied to all four brakes according to their individual requirements, and in this respect my novel system is decidedly flexible and reliable although the operations are entirely mechanical; in fact my solely mechanical system possesses all the advantages, as to complete equalization of the transmitted power to the several brake devices, which is possessed by a hydraulic brake system, but avoids the losses and annoyances incident to the use of fluids. In my system, as above described, the toggle-joint lever assures equal application of power simultaneously to both the front and rear wheel brakes, and consequently front and rear wheel brakes on the same side and on each side of the vehicle are applied equally; the transverse equalizer bars 22 and 33 respectively equalize the application of power as between the brake devices of front wheel and front wheel and as between the brake devices of rear wheel and rear wheel. From this it will be clearly evident that a complete and full equalization as between all four brake devices of the vehicle wheels is assured.

While I have described the principles of my invention as applied to a four wheel brake system, I also deem the same to include within the scope thereof the novel mechanical features as applied in a two wheel brake system, and especially the novel mechanical features as applied to operate brake devices on pivotally mounted front vehicle wheels alone, or when used in connection with other forms of power applying mechanism to serve the brake devices of rear vehicle wheels.

I am aware that some changes may be made in the general arrangements and combinations of the several devices and parts of my novel vehicle brake system without departing from the scope of the present invention as set forth in the foregoing specification, and as defined in the appended claims. Hence, I do not limit my present invention to the exact arrangements and combinations of the parts as described in the foregoing specification, nor do I limit myself to the exact details of the construction of said parts, as illustrated in the accompanying drawings.

I claim:—

1. In a vehicle having pivotally mounted front wheels, brake devices for each front wheel provided with plunger members for actuating the same, reciprocable thrust plungers corresponding to each brake device, tubular guides respectively extending between each thrust plunger and the plunger members of said respective brake devices with the opposite ends of which said thrust plungers and brake device plunger members are reciprocably related, trains of transmission elements freely movable longitudinally in said tubular guides between said thrust plungers and brake device plunger members, said tubular guides having freely flexible portions adjacent their connection with said brake devices, and means for actuating said thrust plungers.

2. In a vehicle having pivotally mounted front wheels, brake devices for each front wheel provided with plunger members for actuating the same, reciprocable thrust plungers corresponding to each brake device, tubular guides respectively extending between each thrust plunger and the plunger members of said respective brake devices with the opposite ends of which said thrust plungers and brake device plunger members are reciprocably related, trains of transmission elements freely movable longitudinally in said tubular guides between said thrust plungers and brake device plunger members, said tubular guides having freely flexible portions adjacent their connection with said brake devices, a transverse equalizer bar having its opposite ends pivotally connected respectively with the rear ends of said thrust plungers, a reciprocable push bar having its forward end pivotally connected with the intermediate portion of said equalizer bar, a toggle-joint lever means for actuating said push bar, and a foot lever for actuating said toggle-joint lever means.

3. In a vehicle having a chassis provided with front and rear axle structures, rear wheels driven through said rear axle structure, front wheels pivotally supported from said front axle structure to swing on a vertical axis, brake devices for each rear and front wheel provided with plunger members for actuating the same, a frame work supported by said vehicle chassis, reciprocable thrust plungers corresponding to each brake device, means on said frame work to mount each thrust plunger, tubular guides respectively extending between each thrust plunger and the plunger members of said respective brake devices with the opposite ends of which said thrust plungers and brake device plunger members are reciprocably related, trains of transmission elements freely movable longitudinally in said tubular guides between each thrust plunger and a corresponding brake device plunger member, said tubular guides serving the brake devices of said front wheels having freely flexible portions adjacent their connection with said brake devices, means for actuating said thrust plungers, and spring means for retracting said thrust plungers.

4. In a vehicle having a chassis provided with front and rear axle structures, rear wheels driven through said rear axle structure, front wheels pivotally supported from said front axle structure to swing on a vertical axis, brake devices for each rear and front wheel provided with plunger members for actuating the same, a frame work supported by said vehicle chassis, reciprocable thrust plungers corresponding to each brake device, means on said frame work to mount each thrust plunger, tubular guides respectively extending between each thrust plunger and the plunger members of said respective brake devices with the opposite ends of which said thrust plungers and brake device plunger members are reciprocably related, trains of transmission elements freely movable longitudinally in said tubular guides between each thrust plunger and a corresponding brake device plunger member, said tubular guides serving the brake devices of said front wheels having freely flexible portions adjacent their connection with said brake devices, a transverse equalizer bar having its opposite ends pivotally connected with the rear ends of said thrust plungers serving said front wheel brake devices, a forwardly directed reciprocable push bar pivotally connected with the intermediate portion of said equalizer bar, means on said frame work to mount said push bar, a second transverse equalizer bar having its opposite ends pivotally connected with the rear ends of said thrust plungers serving said rear wheel brake devices, a rearwardly directed reciprocable push bar pivotally connected with the intermediate portion of said second equalizer bar, spring means for retracting said thrust plungers with their equalizer bars and push bars, a toggle-joint lever means connected with and between said forward and rear push bars, and a foot lever for actuating said toggle-joint means.

5. In a brake system for vehicles each wheel of which is provided with a brake mechanism, a self equalizing power transmission means comprising oppositely reciprocable push bars, each push bar having a transverse equalizer bar pivotally connected with its free end, brake actuating transmission means connected intermediate the respective free ends of said equalizer bars and the respective brake mechanisms, a toggle-joint lever means connected with and between said push bars, and means for actuating said toggle-joint lever means.

6. In a brake system for vehicles each wheel of which is provided with a brake mechanism, a self equalizing power transmission means comprising oppositely reciprocable push bars, each push bar having a transverse equalizer bar pivotally connected with its free end, brake actuating transmission means connected intermediate the respective free ends of said equalizer bars and the respective brake mechanism, a toggle-joint lever means connected with and between said push bars, and a pivoted foot lever cooperating with said toggle-joint lever means.

7. In a vehicle brake system, the combination with a vehicle wheel brake mechanism having a plunger device for actuating the same of a reciprocable thrust plunger, a tubular guide extending between said thrust plunger and the brake actuating plunger device, a train of transmission elements movable longitudinally in said tubular guide under the thrust of said thrust plunger to transmit operative movement to said brake actuating plunger device, and means for actuating said thrust plunger.

8. In a vehicle brake system, the combination with a front vehicle wheel which is pivotally supported to swing on a vertical axis of a brake mechanism movable with said wheel, said brake mechanism having a plunger device for actuating the same, a reciprocable thrust plunger, a flexible tubular guide extending between said thrust plunger and said brake actuating plunger device, a train of transmission elements movable longitudinally in said flexible tubular guide under the thrust of said thrust plunger to transmit operative movement to said brake actuating plunger device, and means for actuating said thrust plunger.

9. In a vehicle brake system, the combination with front vehicle wheels which are pivotally supported to swing on vertical axes of brake mechanisms for each wheel and movable therewith, each brake mechanism having a plunger device for actuating the same, a reciprocable thrust plunger to serve each brake mechanism, a flexible tubular guide extending between each thrust plunger and the brake mechanism served thereby, a train of transmission elements movable longitudinally in each flexible tubular guide under the thrust of a thrust plunger to transmit operative movement to the corresponding brake actuating plunger device, a transverse equalizer bar to the ends of which said thrust plungers are respectively pivotally connected, and means for actuating said equalizer bar to produce equalized operative thrusting movements of said thrust plungers.

10. In a vehicle brake system, the combination with front vehicle wheels which are pivotally supported to swing on vertical axes of brake mechanisms for each wheel and movable therewith, each brake mechanism having a plunger device for actuating the same, a reciprocable thrust plunger to serve each brake mechanism, a flexible tubular guide extending between each thrust plunger and the brake mechanism served thereby, a train of transmission elements movable longitudinally in each flexible tubular guide under the thrust of a thrust plunger to transmit operative movement to the corresponding brake actuating plunger device, a transverse equalizer bar to the ends of which said thrust plungers are respectively pivotally connected, a reciprocable push-bar for actuating said equalizer bar, and lever mechanism for actuating said push-bar.

In testimony that I claim the invention set forth above I have hereunto set my hand this 3rd day of September, 1925.

MORRIS MOSKOWITZ.